United States Patent [19]

Arai

[11] Patent Number: 5,689,602
[45] Date of Patent: Nov. 18, 1997

[54] CCD VIDEO SCOPE WITH ILLUMINATION TO THE OBJECT

[75] Inventor: Junichi Arai, Urawa, Japan

[73] Assignee: Moritex Corporation, Japan

[21] Appl. No.: 527,419

[22] Filed: Sep. 13, 1995

[30] Foreign Application Priority Data

Oct. 20, 1994 [JP] Japan .................... 6-255348

[51] Int. Cl.⁶ .................... G02B 6/06
[52] U.S. Cl. .................... 385/119; 385/116
[58] Field of Search .................... 385/116, 901, 385/117, 119, 115, 100; 362/105; 350/96.25; 358/225

[56] References Cited

U.S. PATENT DOCUMENTS

| | | | |
|---|---|---|---|
| 4,234,910 | 11/1980 | Price | 362/105 |
| 4,930,851 | 6/1990 | Yamamoto | 350/96.1 |
| 4,974,094 | 11/1990 | Morito | 358/225 |
| 5,000,533 | 3/1991 | Gerwers | 350/96.25 |
| 5,127,078 | 6/1992 | Terry et al. | 385/116 |
| 5,394,499 | 2/1995 | Ono et al. | 385/119 |
| 5,491,766 | 2/1996 | Huynh et al. | 385/100 |

FOREIGN PATENT DOCUMENTS

| | | | |
|---|---|---|---|
| 0082691 | 6/1983 | European Pat. Off. | 385/119 |
| 5828712 | 2/1983 | Japan | 385/119 |
| 6069616 | 4/1985 | Japan | 385/119 |
| 1114170 | 5/1989 | Japan | 385/119 |

*Primary Examiner*—Rodney B. Bovernick
*Assistant Examiner*—Ellen E. Kang
*Attorney, Agent, or Firm*—Brown, Martin, Haller & McClain

[57] ABSTRACT

A CCD video scope is mounted in a camera head and has an image capture optical system defining an optical axis, and a half mirror with a light source offset from the optical axis and facing the half mirror, which coaxially defracts illumination light in relation to the optical axis. The resultant optical image is incident on a CCD element also lying on the optical axis. Bundled fibers are mounted between the light source and the half mirror, and have a diameter of less than 250μ and a length of 10 times or more the diameter. The light source has a light focusing lens with an exit angle equal to or less than the maximum light incident angle of the optical fiber elements.

7 Claims, 1 Drawing Sheet

CCD VIDEO SCOPE WITH ILLUMINATION TO THE OBJECT

BACKGROUND OF THE INVENTION

1. Field of the Invention

The present invention is related to a CCD video scope with illumination to the object in which illumination light can be irradiated on the subject through the optical axis of the image capture optical system.

2. Description of the Related Art

FIG. 2 is a cross-sectional diagram indicating a conventional CCD video scope with illumination to the object. Half mirror 24, which causes the illumination light to be defracted coaxially in relation to optical axis X of image capture optical system 22, is arranged within camera head 23 which incorporates photographic optical system 22 which causes the optical image to be incident on CCD element 21; and incandescent lamp 25 is arranged as the light source for illumination in a position displaced from optical axis X of said image capture optical system in order to face said half mirror.

By doing this, the illumination light that is irradiated from the incandescent lamp is reflected by the half mirror; this illuminates the subject by being defracted coaxially in relation to optical axis X of the image capture optical system, and the optical image of the subject that is illuminated by this illumination light is captured by the CCD element through the image capture optical system.

Nonetheless, because the light focusing efficiency is low, the light of the incandescent lamp cannot be efficiently utilized, a lamp that is brighter than necessary must be used in order to obtain sufficient illumination of the object, and there is the problem that there is a large energy loss.

For this reason, a light focusing lens is used, but because the precision in manufacture is poor, the main light source cannot spot illuminate the half mirror. If a light diffusion plate is provided, part of the light can suitably spot illuminate the half mirror, but the light utilization efficiency is all the more decreased because of light diffusion.

Furthermore, as indicated in FIG. 3, if instead of the incandescent lamp, the tip of bundled fibers 32 which are connected to an externally provided light source 31 are attached opposing the half mirror, the light output from the bundled fibers can irradiate illumination light on the half mirror with good precision because the directionality is good, but by connecting the bundled fibers, which are heavy and highly rigid, to a camera head, there is the problem that the ease of using the camera head is worsened.

SUMMARY OF THE INVENTION

Thus, the present invention takes up the technical issue of obtaining a bright light for illuminating objects with little energy loss by efficiently focusing the light of the light source incorporated in the camera head, and by illuminating the half mirror with good precision.

In order to resolve these problems, the present invention involves a CCD video scope with illumination to the object in which a half mirror, which coaxially defracts the illumination light in relation to the optical axis (X) of the image capture optical system, is arranged within the camera head in which an image capture optical system is equipped to make the optical image incident on a CCD element, and light source for illumination is arranged in a position displaced from the optical axis (X) of the image capture optical system in order to face said half mirror; and is characterized by mounting between the aforementioned half mirror and the light source for illumination bundled fibers in which multiple optical fiber lines with a diameter of 250µ or less are bundled together, and the length of these fibers are selected at a length that is 10 times or more the diameter of the optical fiber elements, and by the aforementioned light source for illumination comprising a light emitting diode with light focusing lens or a filament lamp with light focusing lens, and by the exit angle of that illumination light being selected to be the maximum light incident angle or less of the optical fiber elements which compose the bundled fibers.

According to the present invention, because the bundled fibers are mounted between the half mirror and the light source for illumination, and because these bundled fibers are formed by bundling optical fiber elements with a diameter of 250µ or less and have a length that is 10 times or more that diameter, incident light modes of the light lines mix and diffuse, and a light spot exits at a fixed exit angle corresponding to the quality of the optical fibers irrespective of the incident angle of the light.

Moreover, because the exit angle of the illumination light of the aforementioned light source for illumination is selected to be the maximum light incident angle or less of the optical fiber elements that compose the bundled fibers, that light is efficiently focussed, and there is little energy loss.

BRIEF DESCRIPTION OF THE DRAWINGS

The present invention will be better understood from the following detailed description of preferred embodiments of the invention, taken in conjunction with the accompanying drawings, in which like reference numerals refer to like parts, and in which.

DETAILED DESCRIPTION OF THE PREFERRED EMBODIMENTS

Figure 1:
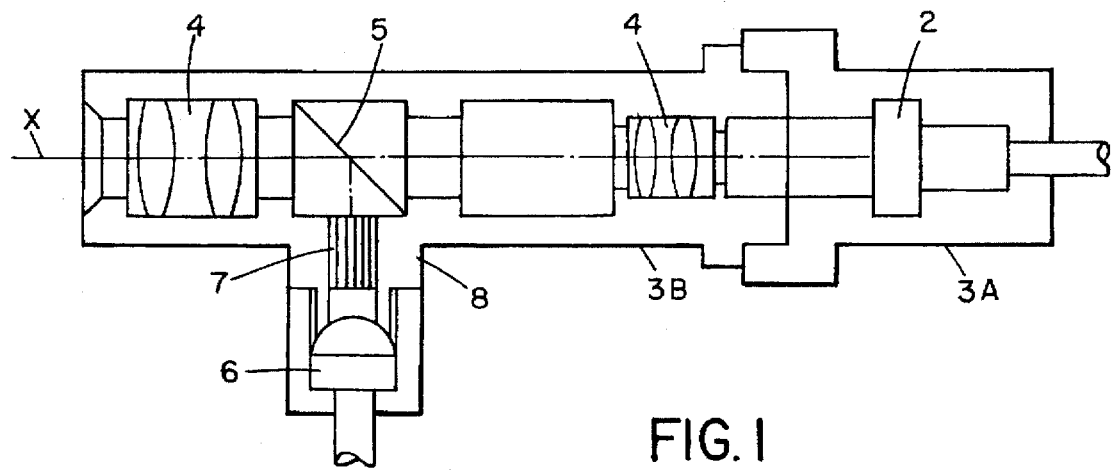
FIG. 1 is a cross-sectional diagram indicating a CCD video scope with illumination to the object according to a preferred embodiment of the present invention.
Figure 2:
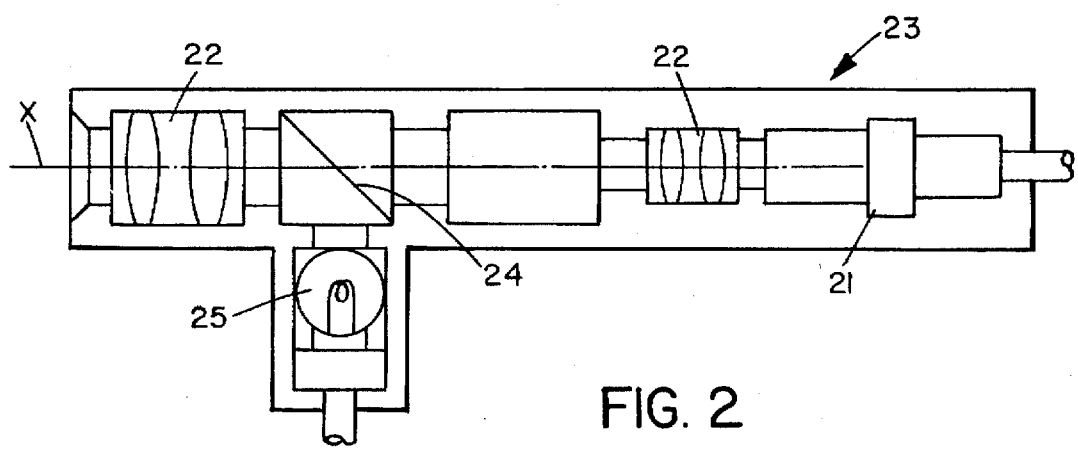
FIG. 2 is a cross-sectional diagram indicating a conventional device.
Figure 3:
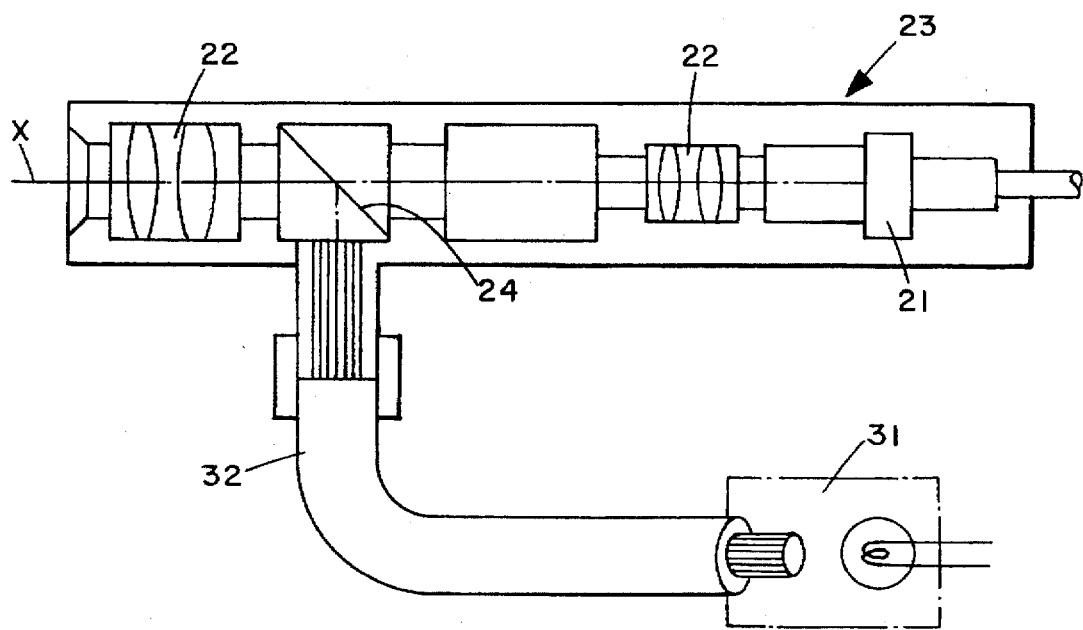
FIG. 3 is a cross-sectional diagram similar to FIG. 2 but with bundled fibers connected to an external light source.

In the Figure, 1 is the camera head which comprises image capture part 3A which incorporates aforementioned CCD element 2, and optical head 3B mounted attachably/detachably on said image capture part 3A; image capture optical system 4 which causes the optical image to be incident on CCD element 2 is incorporated into optical head 3B; half mirror 5 which coaxially deflects illumination light is arranged in relation to optical axis X of image capture optical system 4; and light source 6 for illumination is arranged in a position displaced from optical axis X of image capture optical system 4 so as to face half mirror 5.

Image capture optical system 4 consists of a lens group that can enlarge the subject to the desired magnification, and if using multiple kinds of optical heads 3B, which have image capture optical systems 4 with differing magnifications, the magnification can be modified simply by replacing optical head 3B.

Aforementioned light source 6 for illumination comprises a light emitting diode with light focusing lens or a filament lamp with light focusing lens with, for example, optical line directional characteristics of 60° or less. Mounted between this light source 6 and half mirror 5 are bundled fibers 7, in which multiple optical fibers with diameters of 250µ or less, preferably 100µ or less, are bundled and selected for a length that is 10 times or more the diameter of the optical fiber elements, and the bundled fibers are housed within fitting 8 which is made of metal or plastic.

For bundled fibers 7, so called conduit shaped fibers are used in which multiple optical fiber elements made of multi-component glass, plastic or quartz glass are bundled, and the entire body or both ends are affixed with adhesive or thermally fused together.

In particular, in this example, 50μ diameter optical fiber elements made of multi-component glass are affixed with epoxy group adhesive, and are housed in fitting 8 with an internal diameter of 4 mm and a length of 6 mm. In other words, in this example, the length of the optical fibers is around 100 times the diameter.

Moreover, because the maximum incident angle of the optical fiber element is generally 20°–60°, if, for example, bundled fibers 7 are configured with optical fiber elements having a maximum incident angle of 60°, light source 6 for illumination is lit with a voltage of 1.8 V by adopting fibers which have directional characteristics of an angle that is the maximum light incident angle or less of the optical fiber elements (for example, 20° in this embodiment).

The above is the configuration of one example of the present invention, and next, an explanation will be given of its operation.

First, when light source 6 for illumination is lit and the optical axis of image capture optical system 4 of camera body 1 faces the subject, the illumination light passes through bundled fibers 7, is reflected by half mirror 5, is coaxially defracted in relation to optical axis X of image capture optical system 4; and the illumination light is irradiated on the subject following said optical axis X, the optical image of the subject passes through half mirror 5 via optical axis X of image capture optical system 4, and is incident upon CCD element 2.

At this time light source 6 for illumination consumes very little power because a light emitting diode with a light focusing lens is utilized.

Moreover, because light source 6 for illumination is arranged within camera head 1, it is sufficient if an electrical cord (not indicated in the diagram) is connected to camera head 1. It is not necessary to connect bundled fibers for the purpose of introducing external illumination, and the ease of use is not worsened.

Furthermore, because the directionality of the optical line of power source 6 for illumination is selected to be 60° or less, which is the maximum light incident angle or less of bundled fibers 7, and because optical fiber elements with a diameter of 250μ or less are bundled and selected with a length 10 times or more that of the diameter, light is incident from light source 6 for illumination onto the end surface of bundled fibers 7, the light modes within bundled fibers 7 mix and diffuse, and exit to half mirror 4 as a light spot with a fixed exit angle irrespective of the incident angle of the light.

For this reason, the light incident within bundled fibers 7 is not diffused, and is efficiently utilized as the illumination light without waste; energy loss can be reduced; and object illumination of a sufficient brightness can be obtained by a small scale light source.

In addition, a filament lamp with a light focusing lens may be substituted for the light emitting diode with focusing lens as light source 6 for illumination, and a prism may be used as half mirror 5.

As described above, according to the present invention, because bundled fibers, by which a light spot exits at a fixed exit angle irrespective of the incident angle of the light, are mounted between the half mirror and the light source for illumination, and moreover because the exit angle of the illumination light from the light source for illumination is selected to be the maximum light incident angle or less of the optical fiber elements which compose the bundled fibers, there are the superior effects that that light is efficiently focused, there is little energy loss, and bright illumination light to the object can be obtained.

Although some preferred embodiments of the invention have been described above by way of example only, it will be understood by those skilled in the field that modifications may be made to the disclosed embodiments without departing from the scope of the invention, which is defined by the appended claims.

I claim:

1. A CCD video scope with illumination of an object, comprising:

an image capture optical system defining an optical axis;

a half mirror positioned on the optical axis;

a light source displaced from the optical axis and facing the half mirror;

a CCD element positioned on the optical axis for receiving an optical image of a subject facing the image capture optical system;

a bundle of optical fibers extending from the half mirror to the light source, the fibers having a diameter of 250μ or less and a length of 10 times or more the diameter of the optical fibers, the optical fibers having a maximum incident angle;

the light source having a light focusing lens with an exit angle equal to or less than the maximum incident angle of the optical fibers;

a camera head housing, the CCD element, image capture optical system, half mirror, light source and optical fibers being mounted in said camera head housing; and the camera head housing comprising an image capture part and an optical head releasably mounted on said image capture part, the CCD element being mounted in the image capture part, and the image capture optical system, half mirror, light source and optical fibers being mounted in said optical head.

2. The CCD video scope as claimed in claim 1, wherein the light source is a light emitting diode.

3. The CCD video scope as claimed in claim 1, wherein the light source is a filament lamp.

4. The CCD video scope as claimed in claim 1, wherein the light source is offset to one side of said optical axis and faces in a direction perpendicular to said optical axis.

5. The CCD video scope as claimed in claim 1, wherein the optical fibers have a maximum incident angle of 60° and the light source has an exit angle of 20°.

6. A CCD video scope with illumination of an object, comprising:

an image capture optical system defining an optical axis;

a half mirror positioned on the optical axis;

a light source displaced from the optical axis and facing the half mirror;

a CCD element positioned on the optical axis for receiving an optical image of a subject facing the image capture optical system;

a bundle of optical fibers extending from the half mirror to the light source, the fibers having a diameter of 250μ or less; and the optical fibers having a length in the range from 10 to 100 times the diameter.

7. The CCD video scope as claimed in claim 6, including a camera head housing, the CCD element, image capture optical system, half mirror, light source and optical fibers being mounted in said camera head housing.

* * * * *